(12) United States Patent
Urakabe et al.

(10) Patent No.: US 7,294,984 B2
(45) Date of Patent: Nov. 13, 2007

(54) MOTOR CONTROLLER

(75) Inventors: Takahiro Urakabe, Tokyo (JP);
Tsunenobu Yamamoto, Tokyo (JP);
Yoshihito Asao, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/281,410

(22) Filed: Nov. 18, 2005

(65) Prior Publication Data
US 2006/0108957 A1 May 25, 2006

(30) Foreign Application Priority Data
Nov. 24, 2004 (JP) .......................... P2004-338945

(51) Int. Cl.
*H02P 27/06* (2006.01)
(52) U.S. Cl. ......................................... 318/378; 363/71
(58) Field of Classification Search ........ 318/375–378, 318/722, 801; 363/40, 71
See application file for complete search history.

(56) References Cited

U.S. PATENT DOCUMENTS

| | | | | |
|---|---|---|---|---|
| 4,951,187 A | * | 8/1990 | Stemmler | 363/96 |
| 5,016,158 A | * | 5/1991 | Matsui et al. | 363/71 |
| 5,253,155 A | * | 10/1993 | Yamamoto | 363/71 |
| 5,278,481 A | * | 1/1994 | Danbury | 318/685 |
| 5,325,285 A | * | 6/1994 | Araki | 363/71 |
| 5,657,217 A | * | 8/1997 | Watanabe et al. | 363/71 |
| 6,380,705 B1 | * | 4/2002 | Inagaki et al. | 318/293 |
| 7,009,856 B2 | * | 3/2006 | Moon et al. | 363/37 |
| 2005/0253395 A1 | * | 11/2005 | Blumel | 290/40 C |

FOREIGN PATENT DOCUMENTS

| | | |
|---|---|---|
| JP | 61-73591 A | 4/1986 |
| JP | 6-217596 A | 8/1994 |

OTHER PUBLICATIONS

Brian A. Welchko, et al, "The Influence of Topology Selection on the Design of EV/HEV Propulsion Systems", IEEE Power Electronics Letters, vol. 1, No. 2, Jun. 2003, pp. 36-40.

* cited by examiner

*Primary Examiner*—Bentsu Ro
(74) *Attorney, Agent, or Firm*—Sughrue Mion, PLLC

(57) ABSTRACT

A motor controller is provided which can be reduced in the number of the wirings and power semiconductor devices required while maintaining the function equivalent to or higher than that of the motor controller adopting the existing winding changeover scheme, thereby realizing cost and size reduction and life increase. The motor is made in a structure having motor windings opened at both ends. The one end terminals of phase windings are respectively connected to the output terminals of a first inverter circuit while the other end terminals are respectively connected to the output terminals of a second inverter circuit. During power generation, any one of the inverter circuits is driven on all the phases by means of a same control pulse.

14 Claims, 10 Drawing Sheets

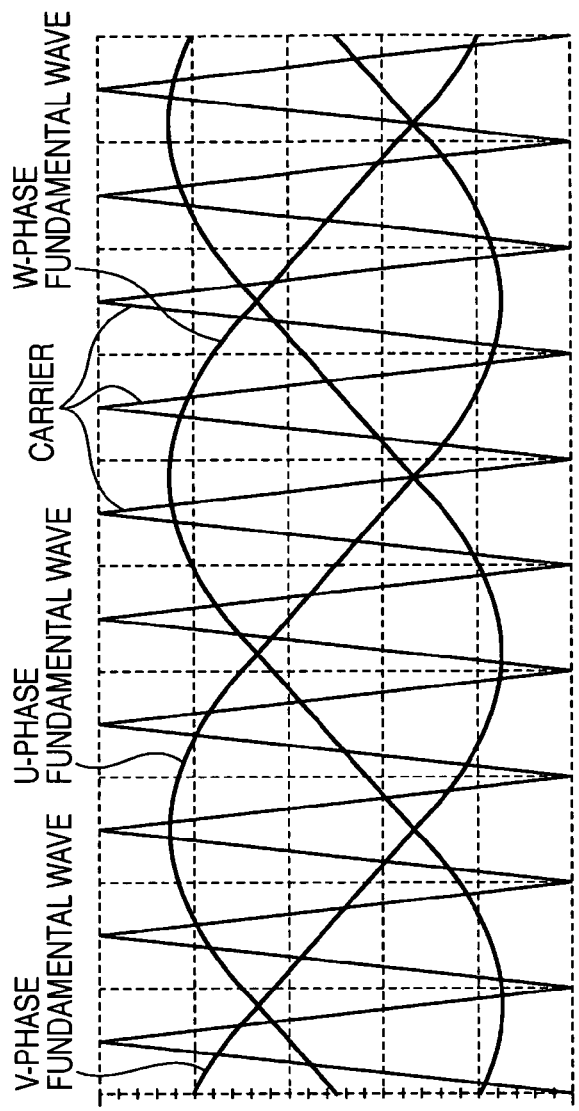
FIG.3A
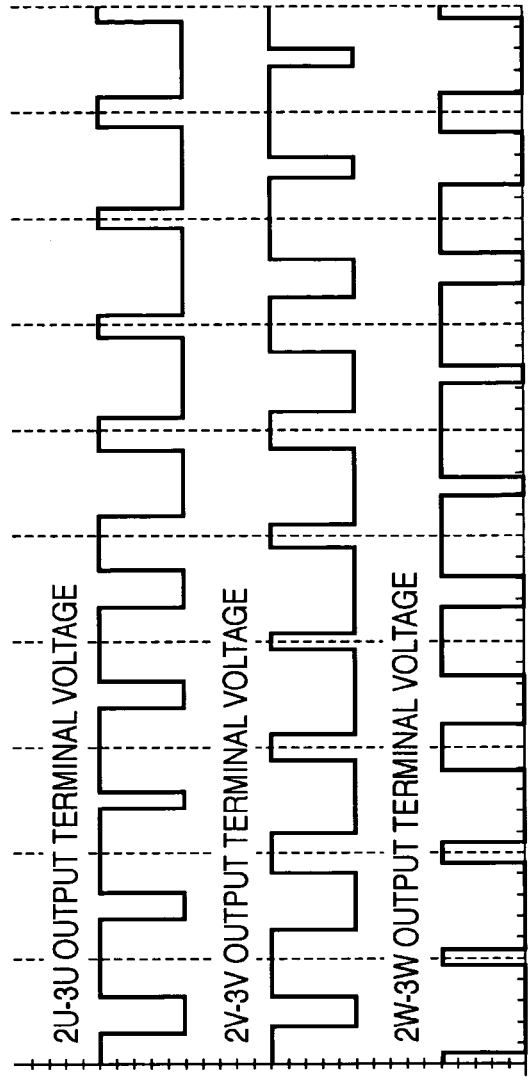
FIG.3B
FIG.3C
FIG.3D

GHU, GHV, GHW

GLU, GLV, GLW

Y-CONNECTION (LOW ROTATION RANGE)

Δ-CONNECTION (HIGH ROTATION RANGE)

MOTOR CONTROLLER

BACKGROUND OF THE INVENTION

1. Field of the Invention

This invention relates to motor controllers, and more particularly to a motor controller adopting a winding changeover scheme.

2. Description of the Related Art

In the existing vehicular alternating-current motors, it is a practice to carry out a changeover control of the stator winding from a star connection (Y connection) to a triangular connection (Δ connection) in order to improve the vehicle performance in medium and high speed ranges. There is a disclosure, for example, in JP-A-61-73591 (FIGS. 1-3 and related explanations thereof), as a motor control method based on such a winding changeover scheme. Namely, when reaching a speed higher than the upper limit of a speed range the ratio of an inverter output voltage and an output frequency is kept constant, the stator windings are changed over from a star connection (Y connection) into a triangular connection (Δ connection), thereby increasing the phase voltages to a $\sqrt{3}$ times those of before changeover and the phase currents to a $1/\sqrt{3}$ times those of before changeover. By doing so, high output is maintained even when there is an increase of rotation rate.

Meanwhile, JP-A-6-217596 (FIGS. 1-5 and related explanations thereof) describes that, in an electric-automotive motor having a double motor structure for driving the output shaft, the connection between motor windings is changed from a star connection (Y connection) to a triangular connection (Δ connection) in order to extend its rotation-rate range, thereby obtaining a desired output torque even in a high speed range. The power to the motor is supplied through contactors after converting a direct-current power source (battery) into three-phase alternating current power by use of two inverters. The contactors receive a winding-changeover signal from the ECU (electronic control unit) and change the connection between the windings of the motor.

However, such connection changeover with using the contactors is, concretely, by a configuration as in FIG. 3 or 5 in JP-A-6-217596, i.e., for one inverter route, each contactor is connected to the motor winding through six lines and six contacts. There is a problem that the contactor for use in turning on-off a great current is expensive and moreover to be shortened in life by frequent on-off uses. Meanwhile, the contactors can be configured by power semiconductor devices. However, in such a case, there requires an increased number of power semiconductor devices resulting in a problem of size and cost increase for the device.

SUMMARY OF THE INVENTION

It is an object of the present invention to provide a motor controller which can be reduced in the number of the wirings and power semiconductor devices required while maintaining the function equivalent to or higher than that of the motor controller adopting the existing winding changeover scheme, thereby realizing cost and size reduction and life increase.

A motor controller according to the present invention comprises: a motor having a plurality of stator windings each opened at both ends; a first inverter circuit configured with a plurality of phases of switch blocks whose output terminals are connected to one ends of the stator windings; a second inverter circuit configured with a plurality of phases of switch blocks whose output terminals are connected to the other ends of the stator windings; a control circuit for controlling switch elements configuring the inverter circuits; and an energy storage source connected to respective direct-current input terminals of the first and second inverter circuits; whereby, during power generation, the switch blocks constituting any one of the inverter circuits are driven on all the phases by means of a same control signal.

According to the invention, the motor is made in a structure having the motor windings opened at both ends. The one end terminals of the phase windings are respectively connected to the output terminals of the first inverter circuit while the other end terminals are respectively connected to the output terminals of the second inverter circuit. During power generation, any one of the inverter circuits is driven on all the phases by means of a same control pulse. This realizes a function equivalent to or higher than that of the existing winding-changeover-scheme motor apparatus, thus providing an effect that the power semiconductor elements configured can be reduced in the number and the apparatus can be reduced in cost and size.

BRIEF DESCRIPTION OF THE DRAWINGS

FIGS. 3A-3D are figures showing a relationship between a motor winding drive voltage waveform and control signals (carrier signal, three-phase alternating-current fundamental waves) upon powering in the first embodiment of the invention;

DESCRIPTION OF THE PREFERRED EMBODIMENTS

First Embodiment

Figure 1:
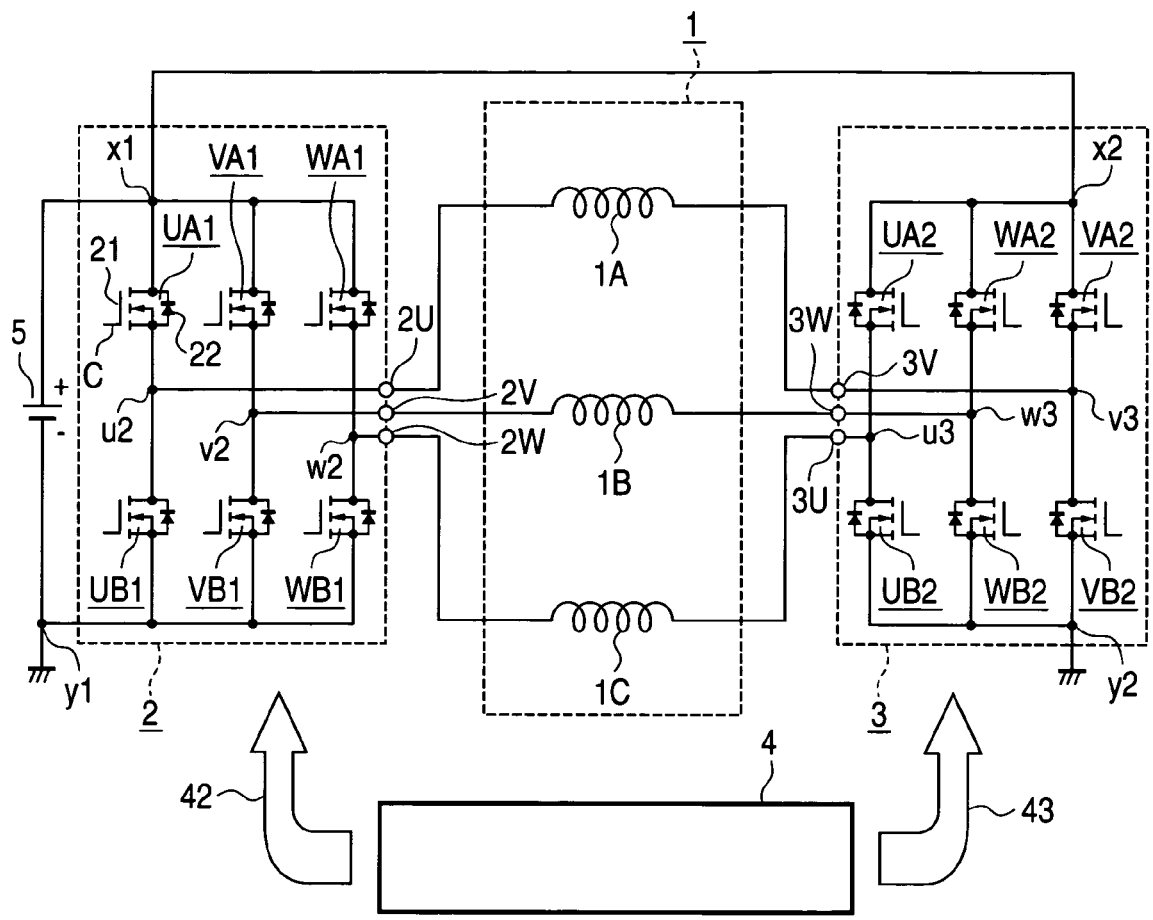
FIG. 1 is diagram showing a circuit configuration diagram of a motor controller according to a first embodiment of the present invention.

FIG. 1 shows a system configuration of a motor controller according to a first embodiment of the present invention. This system is configured as an electric motor generator having not only a function as an electric motor realizing so-called idle stop/start, say, automatically stopping the engine upon stopping the automobile and automatically operating it at a start thereof but also a function as the existing automotive alternator. The motor controller of the invention includes a motor 1 having stator windings 1A, 1B, 1C, inverter circuits 2, 3 for driving the motor 1, a control circuit 4 for forming a gate signal with which the two inverter circuits 2, 3 are controlled in operation, and a battery 5 which is a power source for driving the motor 1 and to which the generation energy is regenerated. The three-phase motor windings 1A, 1B, 1C are made opened at both ends, i.e. the both ends of the windings are extended out of the motor without providing a Δ-connection or a Y-connection. Each phase of winding has one end connected to an output terminal of the inverter circuit 2 while the other end terminal is connected to an output terminal of the inverter circuit 3.

The motor 1 is a three-phase alternating-current motor that generated power can be controlled freely by controlling a generated magnetic flux on the rotor with a field current, though there is no showing of the field winding and the drive circuit for controlling the current by the field winding. The both ends of the motor windings 1A, 1B, 1C are extended out of the motor as noted before wherein one end of the winding 1A is connected to an output terminal 2U of the inverter circuit 2 while the other end is to an output terminal 3V of the inverter circuit 3. Likewise, one end of the motor winding 1B is connected to an output terminal 2V of the inverter circuit 2 while the other end is to an output terminal 3W of the inverter circuit 3. One end of the motor winding 1C is connected to an output terminal 2W of the inverter circuit 2 while the other end is to an output terminal 3U of the inverter circuit 3.

The inverter circuit 2 is constituted by a parallel connection of three blocks wherein a series connection of two switch elements (e.g. UA1, UB1) is taken as one block. One switch element UA1 is structured by a parallel connection of a MOSFET 21 and a diode 22 (true for all the switch elements). The parallel-connected diode 22 may be formed by utilizing a parasitic diode formed within the MOSFET 21. In one switch block, there are connections between connection points u2, v2, w2 of the two switch elements and the output terminals 2U, 2V, 2W of the inverter circuit 2. The remaining two terminals x1, y1 are respectively connected to the "+" and "−" ends of the battery 5 as an energy storage source. The six switch elements UA1, UB1, VA1, VB1, WA1, WB1, configuring the inverter circuit 2, have respective control terminals-c so that a control signal 42 formed in the control circuit 4 can be inputted to perform a switch operation of the inverter circuit 2.

The inverter circuit 3 is similarly constituted with three switch blocks. Connections are provided between the connection points u3, v3, w3 of the two switch elements constituting one block and the output terminals 3V, 3W, 3U of the inverter circuit 3. Input terminals x2, y2 are respectively connected to the "+" and "−" ends of the battery 5. Meanwhile, the six switch elements UA2, UB2, VA2, VB2, WA2, WB2, configuring the inverter circuit 3, are respectively controlled by a control signal 43 formed by the control circuit 4.

The operation of the controller is now described separately upon powering (motor-driven idle start) and during power generation.

Figure 2:
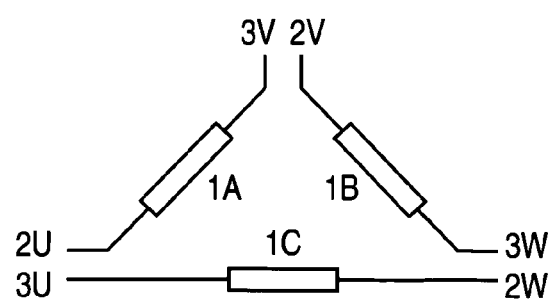
FIG. 2 is a diagram showing a motor winding form upon powering in the first embodiment of the invention.

First, the motor windings 1A, 1B, 1C upon powering are current-driven in the state of a triangular (Δ) connection as shown in FIG. 2 by means of the inverter circuits 2, 3. Namely, in the control circuit 4, a control signal (PWM signal) is generated by combining three phases of sinusoidal alternating-current fundamental waves U, V, W with a carrier signal, as shown in FIG. 3A. With using the signal, the twelve switch elements UA1, UB1, VA1, VB1, WA1, WB1, UA2, UB2, VA2, VB2, WA2, WB2 are controlled. Thereupon, U-phase, V-phase and W-phase voltage waveforms respectively appear at the output terminals 2U, 3U, 2V, 3V and 2W, 3W, as shown in FIGS. 3B, 3C and 3D. By thus driving the motor, a current can be caused to flow to the motor windings in an amount of rated current of the inverter circuit.

Figure 4:
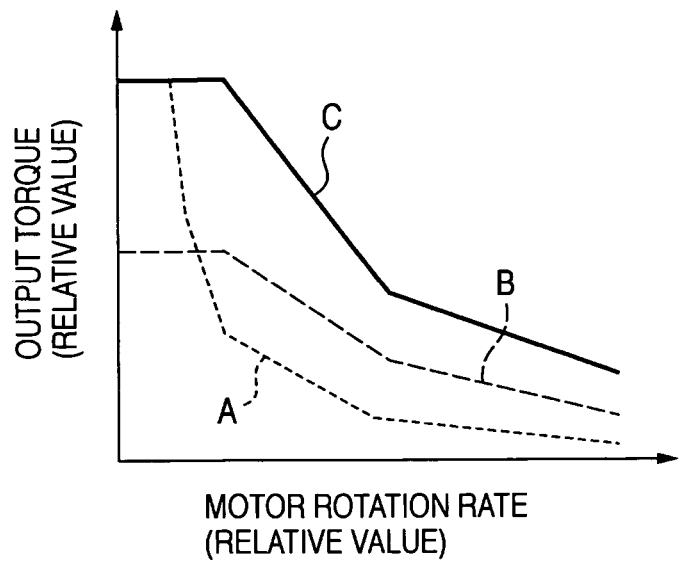
FIG. 4 is a figure showing a relationship between a motor rotation rate and a motor output torque upon powering in the first embodiment of the invention.

FIG. 4 shows a relationship between a motor rotation rate and a motor output torque under motor control upon powering, wherein comparatively shown together is the existing characteristic in a combination of one inverter circuit and a triangular (Δ) or star (Y) connection. In the figure, A represents a characteristic in a combination of one inverter circuit and a star (Y) connection, having a nature that output torque decreases with increasing rotation rate despite high output torque is obtainable at low motor rotation rate as well known. Meanwhile, B in the figure represents a characteristic in a combination of one inverter circuit and a triangular (Δ) connection, wherein output torque increases with increasing rotation rate as compared to the case in the combination with a star (Y) connection despite output torque decreases at low motor rotation rate. Meanwhile, according to the first embodiment of the invention, higher torque can be obtained over the entire range of operation than the existing motor as shown in C. Incidentally, the detail, as to the output increase by virtue of a combination of a motor winding open structure with a two-inverter structure, is described in "The Influence of Topology Selection on the Design of EV/HEV Propulsion Systems": Brain A. Welchkoand James M. Nagashima, IEEE POWER ELECTRONICS LETTERS, VOL. 1, NO. 2, pp. 36-40 (JUNE 2003).

Now is the operation of power generation is described. The invention is characterized in the operation of the motor apparatus during power generation. Namely, all the switch elements of the inverter circuit 2 are turned off in a motor low rotation range, to cause a diode-rectified power generation from the inverter circuit 2. Simultaneously, the switch blocks of the inverter circuit 3 are operated on-off by means of the same control signal. Meanwhile, in a motor higher rotation range, the on-off operation is ceased to cause a power generation based on diode rectification from the both of the inverter circuits 2, 3.

Figure 5A:
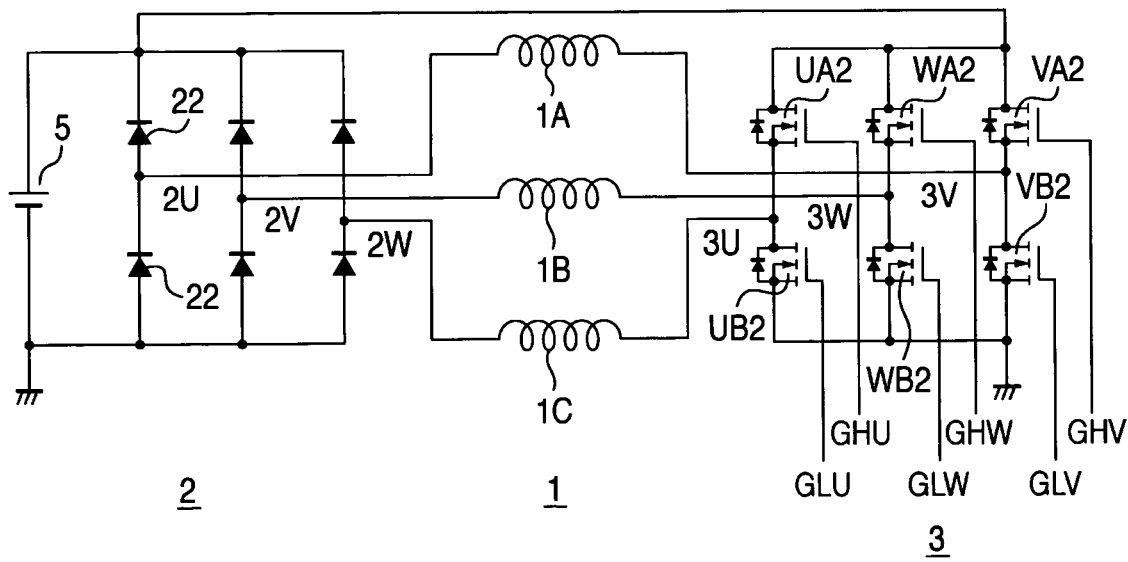
FIGS. 5A-5C are figures showing an operation state in a low rotation range during power generation in the first embodiment of the invention
Figure 5B:
Figure 5C:
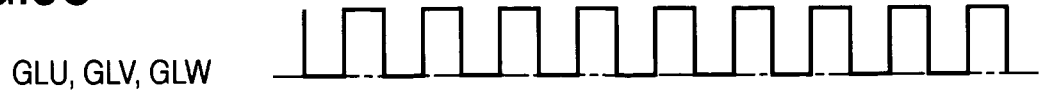

FIG. 5 shows an operation status in a low rotation range wherein FIG. 5A is an equivalent-circuit diagram thereof while FIGS. 5B and 5C show the control signal waveforms in that case. Namely, in a low rotation range, the control signal to the inverter circuit 2 is rendered at low voltage, to place all the switch elements into an off state. For this reason, the inverter circuit 2 is in a three-phase bridge connection with sole parallel diodes 22. Meanwhile, a rectangular-wave signal having a constant duty ratio, say, at frequency 10 kHz, as shown in FIGS. 5B and 5C, is inputted to the control-signal terminal of the inverter circuit 3. The inverter circuit 3 is arranged, at a side closer to the battery 5 "+" side, with switch elements UA2, WA2, VA2 whose signals GHU, GHW, GHV are all the same control signals. The inversion signals GLU, GLW, GLV to those are inputted similarly to the switch elements UB2, WB2, VB2 arranged on a side closer to the "−" end.

Accordingly, the equal voltage is always applied to the three motor winding ends 3U, 3V, 3W on the side closer to the inverter circuit 3. The motor voltages induced on the motor windings are superimposed with the voltages generated on the side of the inverter circuit 3. By virtue of such voltage rise, a desired generated power is to be obtained even in a low rotation range.

Figure 6:
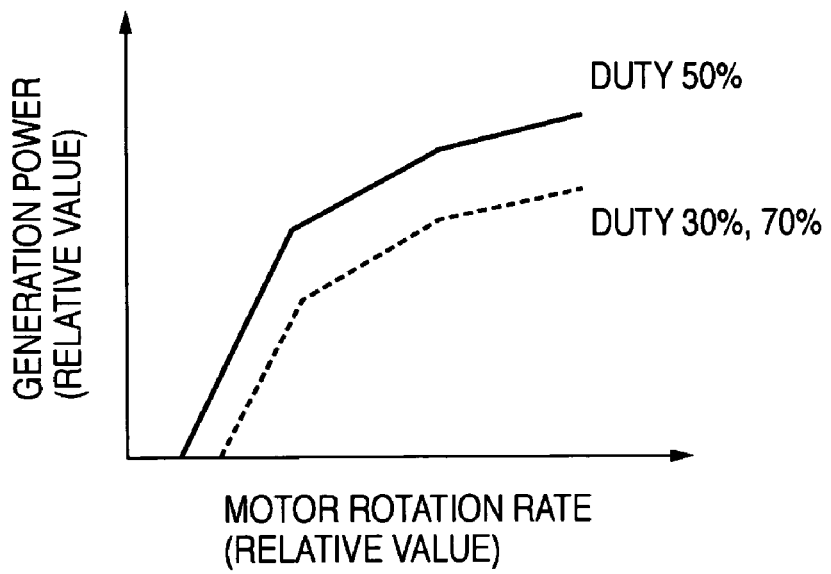
FIG. 6 is a figure showing a relationship, based on duty, between a motor rotation rate and a generated power in a low rotation range during power generation in the first embodiment of the invention.

FIG. 6 shows a measurement as to the relationship between a motor rotation rate and a motor generated power in the case varied is the duty ratio of the rectangular wave signal to be inputted to the control signal terminal of the inverter circuit 3. It is revealed that there is a constant relationship between a control signal duty ratio and a generated power. Namely, it can be seen that there is an optimal value at a duty ratio 50% whereas generated power conversely lowers at a duty ratio 30% or 70%, as apparent from the figure. However, the duty ratio is suitably provided in a setup range of 40 to 60% in view of the actual service environment noted below.

Figure 7:
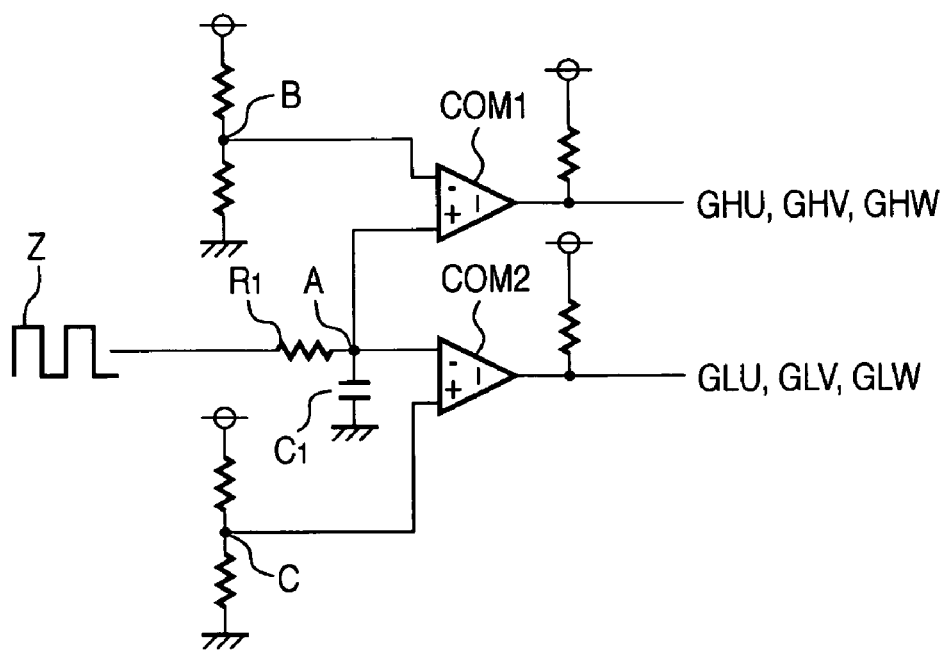
FIG. 7 is a circuit example for generating a signal for use in operating on-off of the switch elements.
Figure 8:
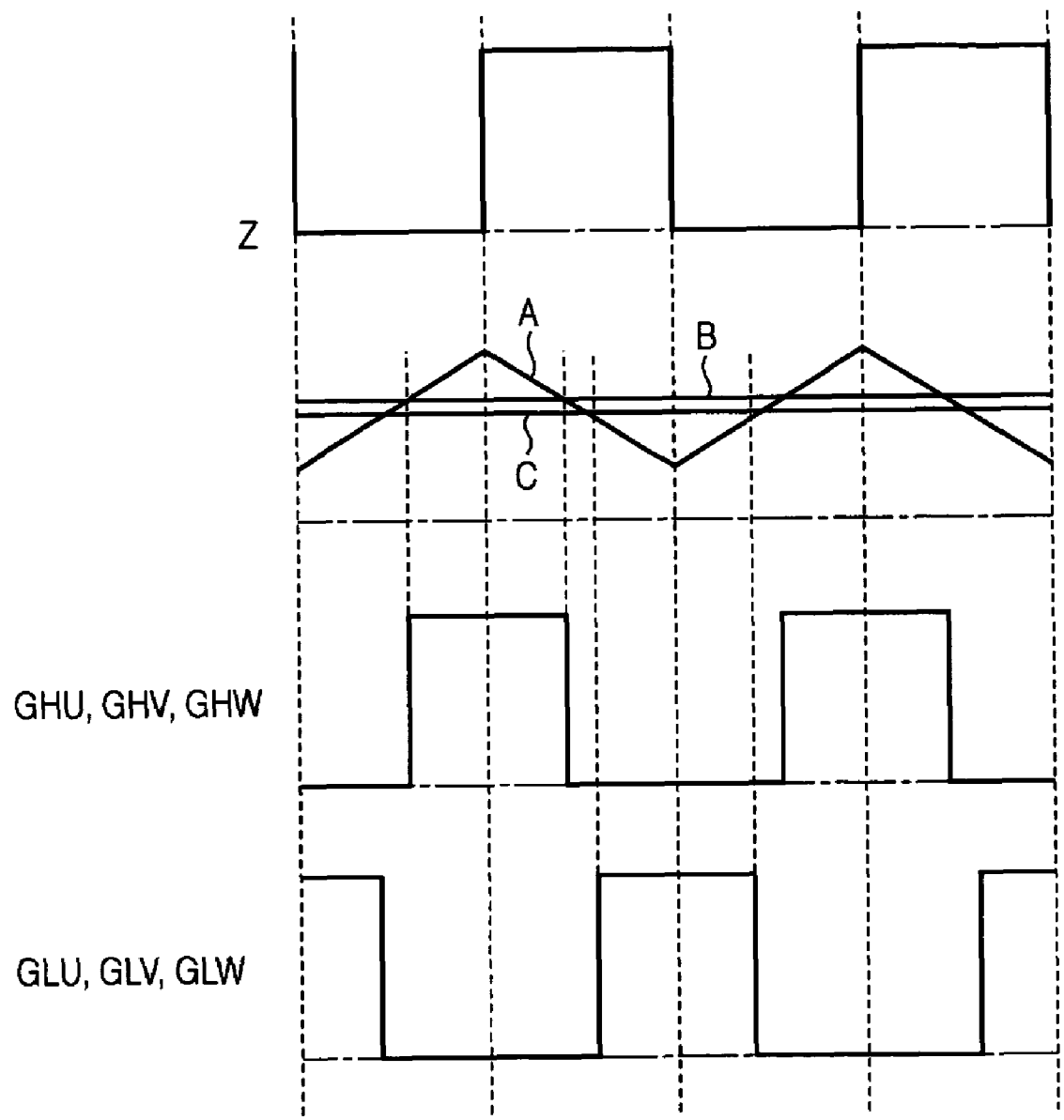
FIG. 8 is a timing chart of signals on a circuit shown in FIG. 7.

FIG. 7 shows a circuit example for generating the signals GHU, GHV, GHW and GLU, GLV, GLW to cause an on-off operation. FIG. 8 shows a signal timing on the above circuit. The rectangular pulse Z with a duty ratio 50%, outputted from a microcomputer, is converted into a sawtooth signal A at a CR circuit C1, R1. The signal A is compared in voltage magnitude by a comparator COM 1 with a reference voltage signal B obtained by dividing with resistances the circuit power voltage, thereby forming signals GHU, GHV, GHW. Also, the signal A is compared in voltage magnitude by a comparator COM 2 with a reference voltage signal C obtained by dividing with resistances the circuit power voltage, thereby forming signals GLU, GLV, GLW. The reason of providing a voltage difference between the signals B and C is because of providing a dead time not to cause a short circuit across a power semiconductor device in one block. In such a structure as provided with a dead time, the duty ratio is somewhat deviated from 50% in the signals GHU, GHV, GHW and GLU, GLV, GLW.

Figure 9:
FIG. 9 is a figure showing a relationship between a duty ratio and a generated power at a predetermined rotation rate in the first embodiment of the invention.

FIG. 9 shows a measurement on the relationship between a duty ratio and a generated power, at a motor rotation rate of 1600 rpm. From this, concerning the duty ratio deviation range in the on-off operation, it has been known that generated power lowers approximately 10% in a duty ratio setup range of 40 to 60% when taking account of the variations on the circuit elements such as resistance and capacitance and temperature change in those elements.

Figure 10:
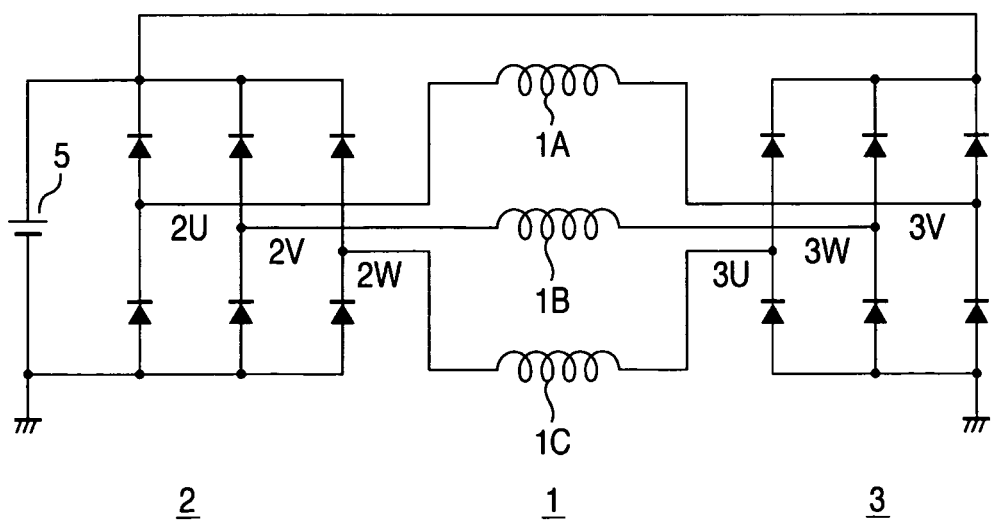
FIG. 10 is a diagram showing an operation state in a high rotation range during power during power generation in the first embodiment of the invention.

FIG. 10 shows an operation state of the motor in a high rotation range. In a high rotation range, i.e. in a range higher in generated power than the operation state in a low rotation range, the signals at the control terminals of the both inverter circuits 2, 3 are rendered low, to turn all the switch elements of the inverter circuits off. In this state, the inverter circuits 2, 3 both serve as diode-based bridge circuits, wherein the motor connection is in a triangular (Δ) connection form. Accordingly, the motor generated power is moved to the battery 5 by the diode rectification operation on the both sides.

As described above, according to the first embodiment of the invention, in a low motor rotation rate during power generation, power generation output can be obtained in a low rotation range by on-off-driving the one ends of three motor windings by means of the inverter circuit. Meanwhile, in a high rotation range, the motor connection is made in a triangular (Δ) connection to cause power regeneration operation due to the diode rectification circuit. Thus, sufficient power generation output can be obtained even in a high rotation range. Meanwhile, because the on-off operation of the inverter circuit is effected at a constant duty ratio, there is a feature for easy realization without requiring any control parameter.

If compared with the number of power semiconductor switch elements of the existing winding-changeover-type motor controller aiming at the similar effect, the existing controller has six elements in the inverter section and twelve elements in the winding changeover section, i.e. totally eighteen elements whereas the winding-changeover-type motor driver of the invention has twelve elements in the two inverter circuits. Thus, configuration is satisfactorily with elements less by six in the number of elements, which moreover can obtain equivalent or greater motor torque and nearly equivalent motor power generation output.

Figure 11:
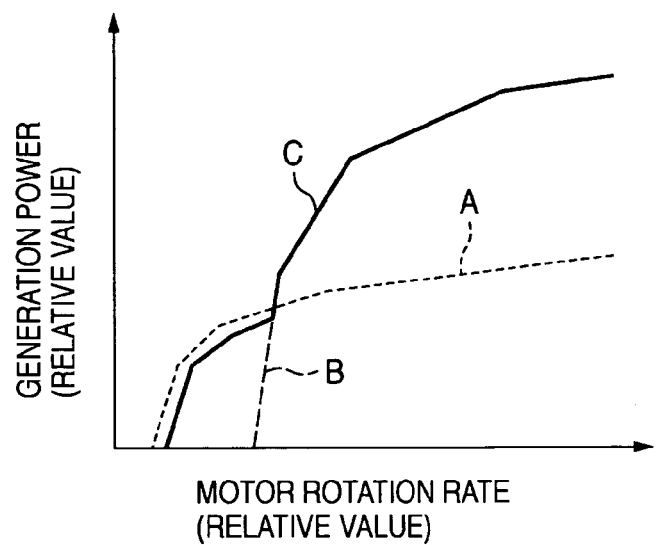
FIG. 11 is a figure showing a relationship between a motor rotation rate and a generated power during power during power generation in the first embodiment of the invention.

FIG. 11 shows a relationship between a motor rotation rate and a motor generated power during power generation as noted before, wherein comparatively shown together is the existing characteristic of a combination of one inverter circuit and a triangular (Δ) or star (Y) connection.

In the figure, A represents a characteristic in a combination of one inverter circuit with a star (Y) connection, having a nature that output torque goes into saturation as rotation rate increases despite high output torque is obtainable at low motor rotation rate as well known. Meanwhile, B in the figure represents a characteristic in a combination of one inverter circuit with a triangular (Δ) connection, wherein output torque increases with increasing rotation rate as compared to the case in the combination with the star (Y) connection despite output torque lowers at low motor rotation rate. Meanwhile, according to the invention, higher torque is obtainable over the entire range of operation than the existing motor as shown in C. Namely, with only the usual diode rectification, nothing can be obtained but a triangular (Δ) connection power curve shown at B in the figure. However, by the above on-off operation of the inverter circuit 3 (on-off operation may be at the inverter circuit 2), sufficient power generation output is obtainable even in a low rotation range.

Second Embodiment

Figure 12:
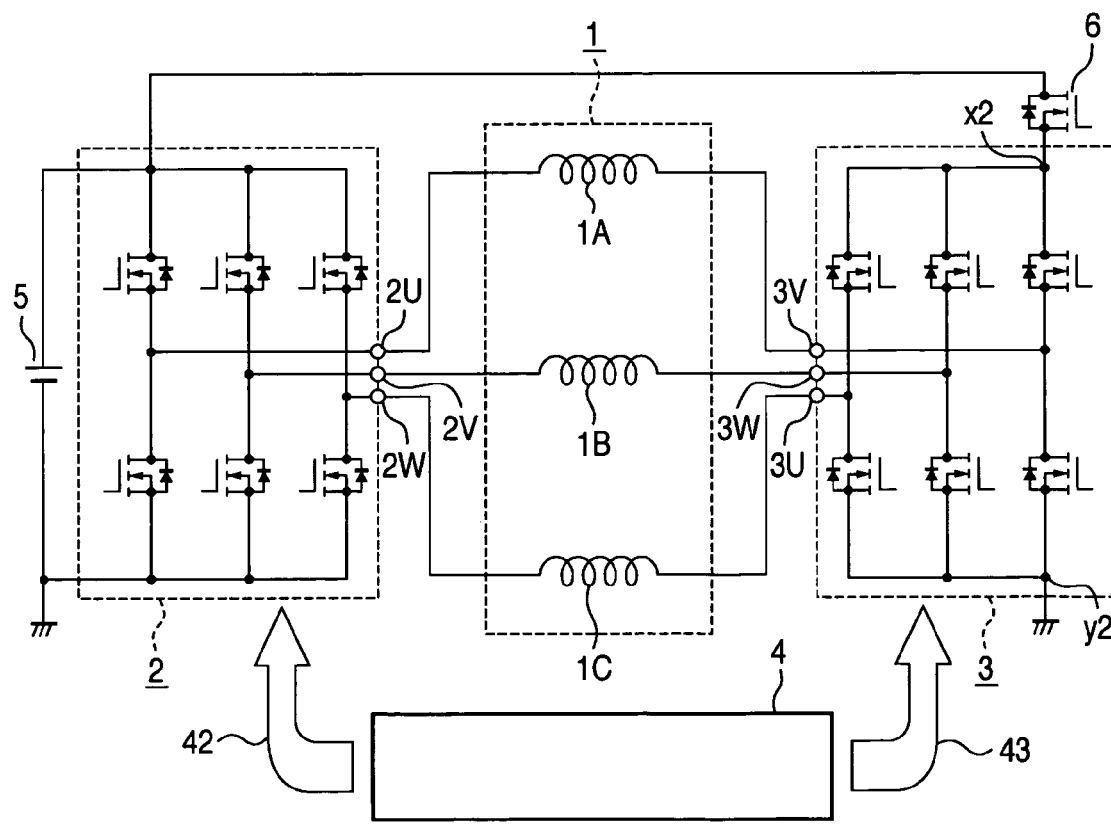
FIG. 12 is diagram showing a system configuration of a motor controller according to a second embodiment of the invention.

FIG. 12 shows a configuration of a motor controller according to a second embodiment of the invention. In the figure, like or corresponding elements are attached with like references. The difference from the first embodiment lies only in that a changeover switch 6 is inserted between a battery "+" side input terminal x2 of the switch block of an inverter circuit 3 and the "+" terminal of the battery 5. In the second embodiment, the changeover switch 6 is structured by a MOSFET.

The operation of the controller is now described separately upon powering and during power generation. First of all, a high voltage signal is inputted from the control circuit 4 to a control terminal of the changeover switch 6, to maintain the switch on. This state is similar in state to the first embodiment and hence omitted to explain because the operation is similar, wherein operation and effect is similar to that of the first embodiment.

Figure 13:
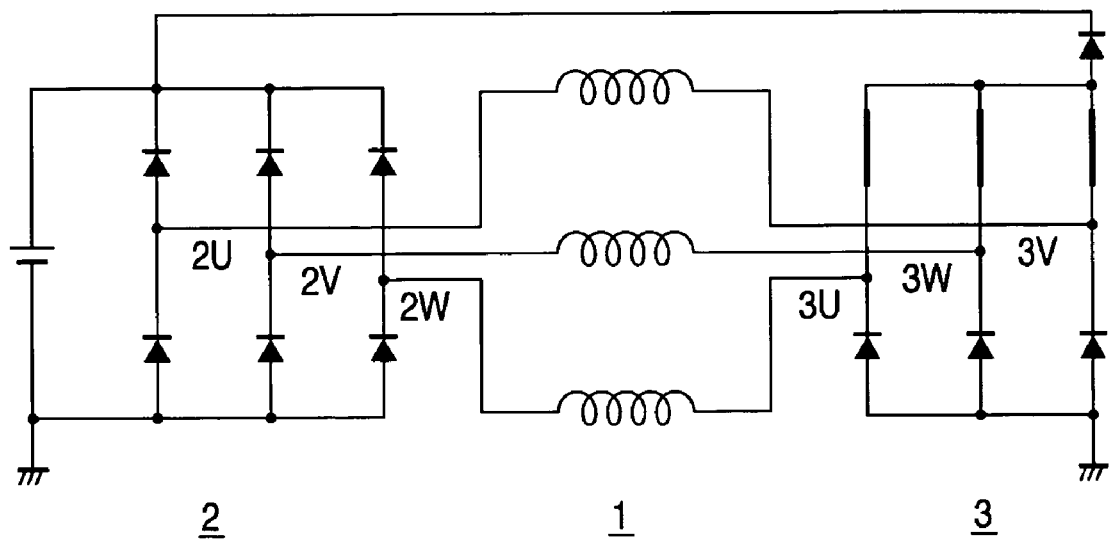
FIG. 13 is a diagram showing an operation state in a low rotation range during power generation in the second embodiment of the invention.

The operation in power generation is now described. First of all, in a low rotation range of the motor, the changeover switch 6 is inputted at its control-signal terminal by a low voltage of from the control circuit 4, thus being turned off. Meanwhile, a high voltage is inputted to the control terminal of the + input-terminal side switch element of each switch block of the inverter circuit 3, to place all the + side switch into an on state. Furthermore, a low voltage is inputted to the control terminal of the – input-terminal side switch element, to place all the – side switch into an off state. Accordingly, in this state, the motor windings are in the state of a star (Y) connection as shown in FIG. 13 by use of the + input terminal side switch elements of the inverter circuit 3. Meanwhile, the inverter circuit 2, because turned off at all the switches, operates as a diode bridge. This rectifies the alternating current generated on the motor windings and converts it into a direct-current power.

Figure 14:
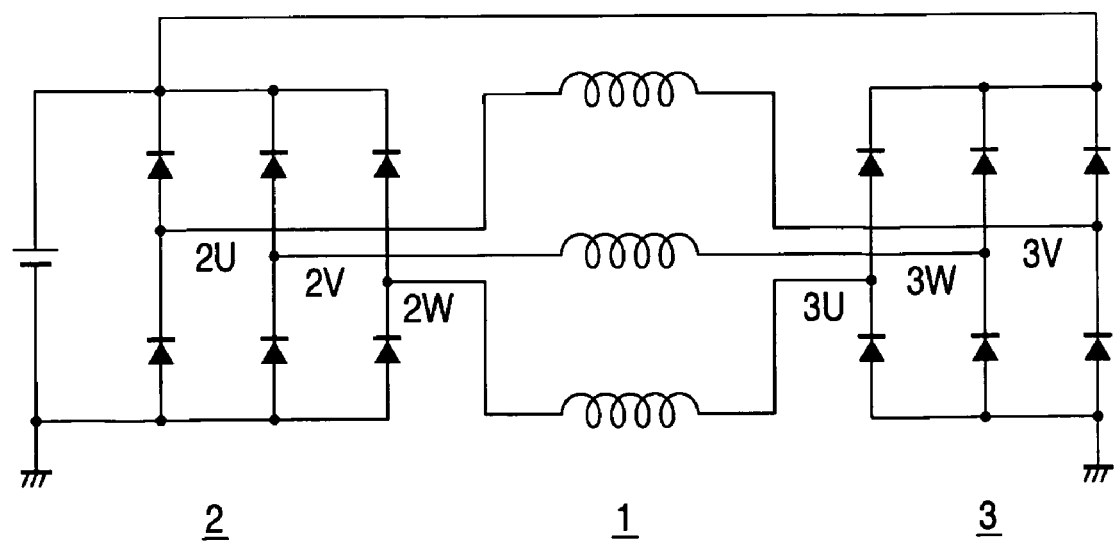
FIG. 14 is a diagram showing an operation state in a high rotation range during power generation in the second embodiment of the invention.
Figure 15:
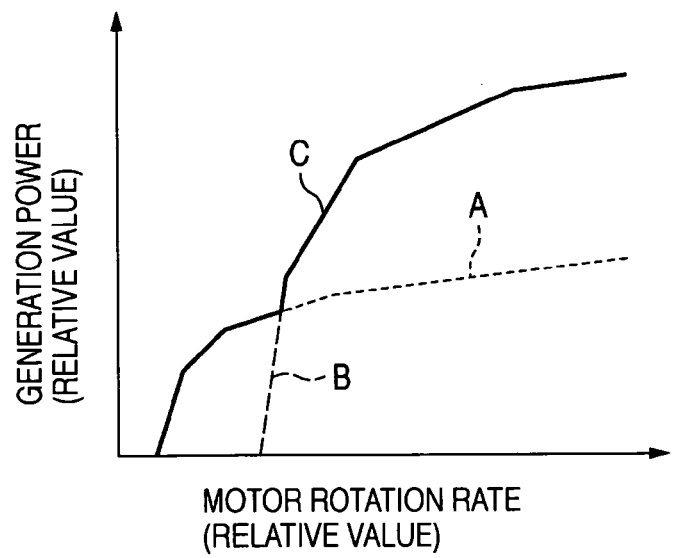
FIG. 15 is a figure showing a relationship between a motor rotation rate and a generated power during power generation in the second embodiment of the invention.

In the motor high rotation range, the changeover switch 6 is inputted by a high voltage from the control circuit 4 and turned on. Meanwhile, a low voltage is inputted to all the switch elements of the inverter circuits 2, 3, so that all the switch elements are turned off. Likewise the first embodiment, a triangular (Δ) connection is established as shown in FIG. 14. The alternating current generated on the motor windings is rectified by the inverter circuits 2, 3 and converted into a direct-current power. FIG. 15 shows a relationship between a motor rotation rate and a generated power during power generation in the second embodiment. Similarly to the first embodiment shown in FIG. 11, the characteristic C in the second embodiment can obtain a generated power equivalent to that of the characteristic A in a star (Y) connection, in a low motor rotation range. Furthermore, in a high motor rotation range, a generated power can be obtained equivalent to that of characteristic B in a triangular (Δ) connection.

As described above, according to the second embodiment of the invention, a desired power generation output can be obtained in a broad operation range including high and low rotation ranges by changing over the motor winding into a start (Y) connection in a low motor rotation range and into a triangular (Δ) connection in a high motor rotation range during power generation. If compared with the number of power semiconductor switch elements constituting the existing winding-changeover-type motor controller, the existing device has eighteen elements whereas the device in the present embodiment of the invention is structured with twelve elements in the two inverter circuits and one switch element provided between the energy storage source and the DC voltage input of any one of the inverter circuits, i.e. totally thirteen elements. Thus, configuration is satisfactorily with 13 elements less by five in the number of elements than the conventional eighteen elements. Moreover, this can obtain equivalent or greater motor torque and nearly equivalent motor power generation output.

If comparing the number of elements with the first embodiment, the second embodiment is greater by one in the number of switch elements 6. However, in the first embodiment, because on-off switching is continuously performed at a comparatively high frequency in the inverter circuit 3, heat generation occurs on the semiconductor device due to the effect of loss upon switching. In the operation on a PWM control signal during powering (idle start), there encounters an increased generation of heat due to the effect of loss upon switching. However, the time required in powering is nearly 0.5 second at the most. The heat energy can be absorbed by a metal-member thermal capacitance, such as a heat sink, arranged in a bottom of the semiconductor device. The temperature rise on the semiconductor device is in a level not conspicuous. However, because the heat generation during continuous power generation raises the temperature on the semiconductor device, design must be made for a semiconductor device bottom structure with full consideration to the cooling performance. Contrary to this, the second embodiment is free from switching at high frequency during power generation and hence smaller in temperature rise on the semiconductor device, thus having a feature that the device can be structured with a simple semiconductor device heat sink.

Incidentally, in the second embodiment, the changeover switch 6 can be replaced with a mechanical switch because of no need of driving with a high frequency pulse as noted before.

Third Embodiment

Figure 16:
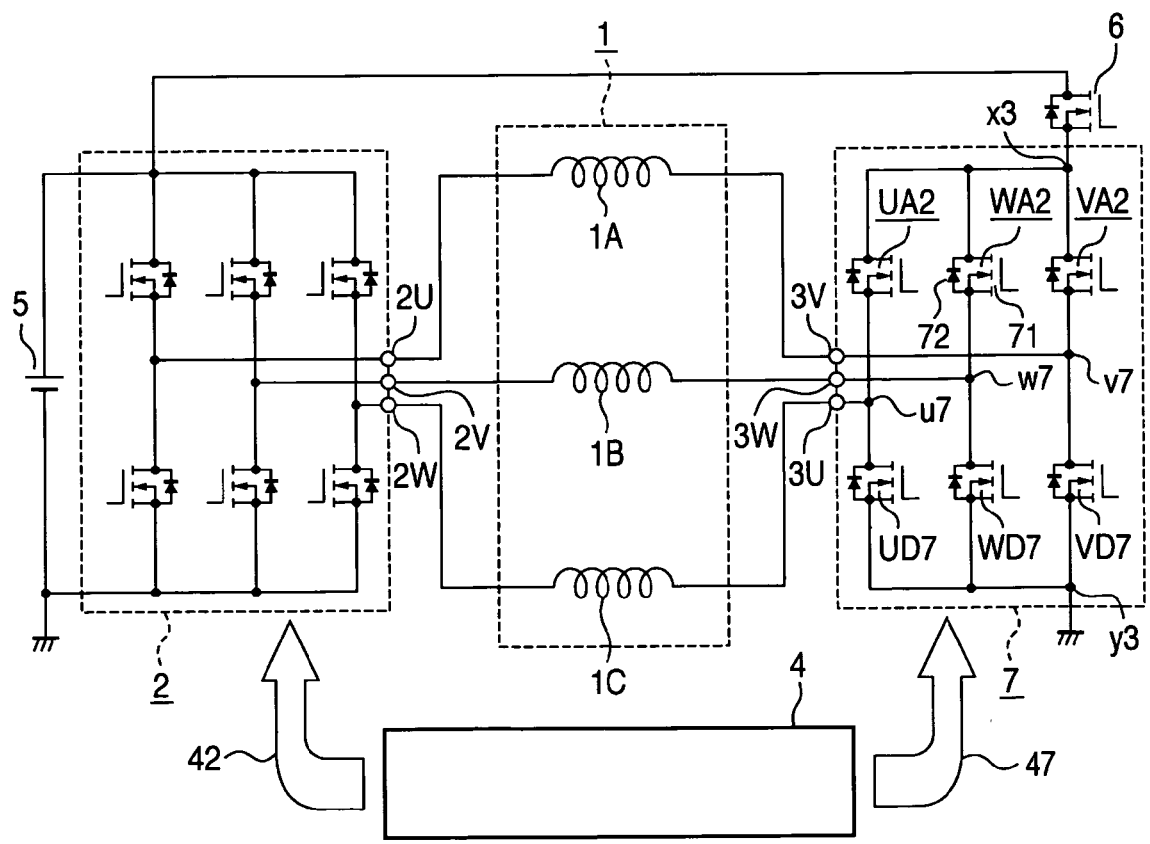
FIG. 16 is diagram showing a system configuration of a motor controller according to a third embodiment of the invention.

FIG. 16 shows a configuration of a motor controller according to a third embodiment of the invention, wherein like or corresponding elements to those of FIG. 12 are attached with like references. This embodiment is effective for the case powering (idle starting) torque is required only in a low rotation range. The difference from the second embodiment lies only in that the inverter circuit 3 is replaced with a switch unit 7 wherein the signal for controlling it is a control signal 47 for the switch unit 7.

The switch unit 7 is configured with a parallel connection of three blocks (WA2 and WD7, VA2 and VD7) wherein a series connection of a semiconductor switch element UA2 having one control terminal and a diode UD7 is taken as one block. The semiconductor switch element UA2, WA2, VA2 is configured with a parallel connection of a MOSFET 71 and a diode 72 (true for other blocks). The diode 72 connected parallel may use a parasitic diode formed within the MOSFET 71.

Within one switch block, being connected to the connection point u7, v7, w7 of the series connected semiconductor switch element and diode and to the output terminal 3U, 3V, 3W of the switch unit 7, the remaining terminal x3 (drain terminal) of the semiconductor switch elements are connected to the "+" end of the battery 5 while the remaining terminal y3 (anode terminal) of the diode is connected to the "−" end of the battery 5. It is similar to the second embodiment in that a changeover switch 6 is inserted between a positive-electrode end input terminal of the switch block of the switch unit 7 and the "+" terminal of the battery 5 and in that three semiconductor switch elements UA2, WA2, VA2 constituting the switch unit 7 are to be controlled according to a control signal 47 formed by the control circuit 4.

Figure 17:
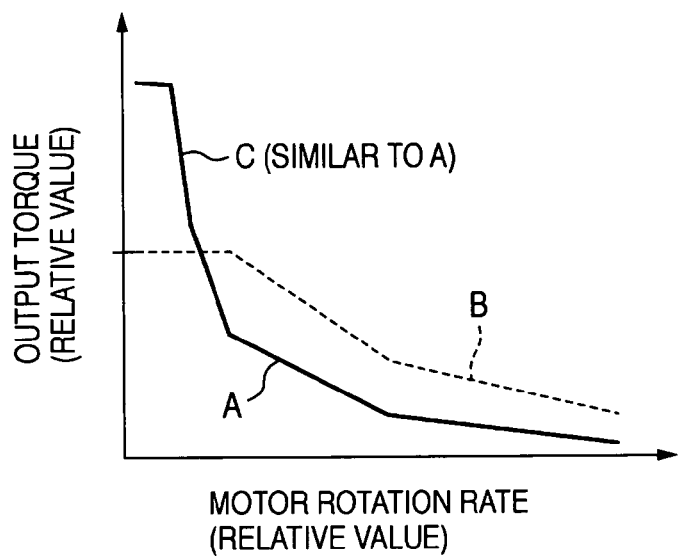
FIG. 17 is a figure showing a relationship between a motor rotation rate and a motor output torque upon powering in the third embodiment of the invention.

The operation is now described. Upon powering (at an idle start), the changeover switch 6 becomes off, to place all the semiconductor switch elements of the switch unit 7 into an off state. In this state, the motor windings assume a star (Y) connection so that the motor 1 is driven by the inverter circuit 2. At this time, the motor rotation rate and the motor torque output have a relationship as shown in FIG. 17. In the characteristic C in the third embodiment, high output torque is obtainable at low motor rotation rate similarly to the characteristic A in a combination of one inverter circuit with a star (Y) connection. Therefore, this embodiment is effective for the case where torque is required only in a low rotation range upon powering, e.g. at an idle start.

Incidentally, the operation during power generation is similar to that in the second embodiment. In a motor low rotation range, the state is maintained similar to that upon powering while, in a motor high rotation range, the changeover switch 6 becomes on and all the switch elements of the switch unit 7 become off. As described above, during power generation, power generation is carried out in a Y connection state in a low motor rotation range and in a Δ connection state in a high motor rotation range.

As described above, according to the third embodiment, the present embodiment is advantageous in respect of cost and size in case desired torque is to be obtained in the present embodiment. Because the semiconductor elements in configuration are less in the number as compared to those of the second embodiment (less by three MOSFET elements) and hence the switching unit 7 may simply perform on-off control, the control circuit can be simplified correspondingly.

In the third embodiment, the MOSFET semiconductor switches of the switch unit 7 can be replaced with mechanical switches because of no need for driving with a high frequency pulse.

Fourth Embodiment

Figure 18:
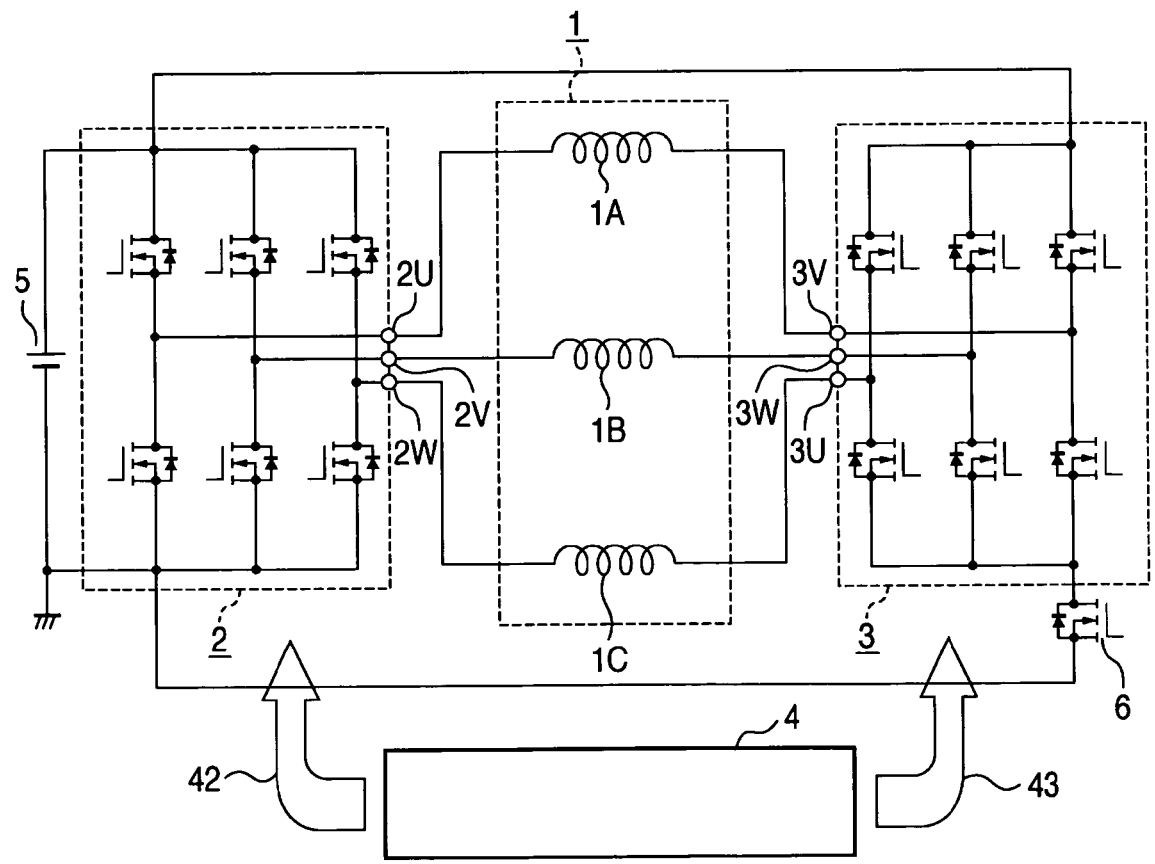
FIG. 18 is diagram showing a system configuration of a motor controller according to a fourth embodiment of the invention.

FIG. 18 shows a configuration of a motor controller according to a fourth embodiment of the invention, which is a modification to the second embodiment. Although the changeover switch 6 in the second embodiment was arranged on the side closer to the "+" end of the battery, the fourth embodiment arranges it on the side closer to the "−" end of the battery. Like and corresponding elements to those in FIG. 12 explaining the second embodiment are attached with like references. In operation, in a low rotation range during power generation, a positive-electrode side input-terminal-side switch element is turned off and a negative-electrode-side input-terminal-side switch element is turned on conversely to the second embodiment. The other operation and effect is similar to that of the second embodiment.

It is natural that the way of thinking in the fourth embodiment can be applied to the third embodiment.

Incidentally, the first to fourth embodiments described that all the switches of the inverter circuit are turned off to operate as a diode bridge rectification circuit. In this case, the inverter circuit may perform so-called a synchronous rectification operation that the MOSFET is turned on in synchronism with diode current conduction. In the synchronous rectification operation, there is an effect that impedance is reduced to reduce the energy loss due to conduction because both the diode and the MOSFET arranged in parallel are to operate on in the synchronous rectifying operation.

Meanwhile, although the first to fourth embodiments used MOSFETs as switch elements, IGBTs or other switch elements naturally can be employed in place thereof.

What is claimed is:

1. A motor controller comprising:
a motor having a plurality of stator windings each opened at both ends;
a first inverter circuit configured with a plurality of phases of switch blocks whose output terminals are connected to one ends of the stator windings;
a second inverter circuit configured with a plurality of phases of switch blocks whose output terminals are connected to the other ends of the stator windings;
a control circuit for controlling switch elements configuring the inverter circuits; and
an energy storage source connected to respective direct-current voltage input terminals of the first and second inverter circuits;
whereby, during power generation, the switch blocks constituting any one of the inverter circuits are driven on all the phases by means of a same control signal.

2. A motor controller according to claim 1, wherein, in a low rotation range of the motor during power generation, the switch blocks of any one of the inverter circuits are operated for power generation with diode rectification while the switch blocks of the other of the inverter circuits are operated on-off on all the phases by means of a same control signal.

3. A motor controller according to claim 2, wherein the switch elements of the other inverter circuit are operated on-off by means of a same control signal fixed in duty ratio in a range of 40-60%.

4. A motor controller according to claim 2, wherein, in a high rotation range of the motor, the switch block of the first and second inverter circuits are operated for power generation with diode rectification.

5. A motor controller according to claim 1, wherein the switch elements constituting the switch block is configured by a parallel connection of a MOSFET and a diode.

6. A motor controller comprising:
a motor having a plurality of stator windings each opened at both ends;
a first inverter circuit configured with a plurality of phases of switch blocks whose output terminals are connected to one ends of the stator windings;
a second inverter circuit configured with a plurality of phases of switch blocks whose output terminals are connected to the other ends of the stator windings;
a control circuit for controlling switch elements configuring the inverter circuits; and
an energy storage source connected to respective direct-current voltage input terminals of the first and second inverter circuits;
wherein a changeover switch is connected between the direct-current voltage input terminal of any one of the first and second inverter circuits and one of positive and negative electrodes of the energy storage source.

7. A motor controller according to claim 6, wherein, during power generation, the switch blocks of the inverter circuit closer to a provision of the changeover switch are switchover-controlled to a star (Y) connection in a low rotation range of the motor and to a triangular (Δ) connection in a high rotation range of the motor while the other inverter circuit is operated with diode rectification.

8. A motor controller according to claim 6, wherein the changeover switch is configured by a parallel connection of a MOSFET and a diode.

9. A motor controller comprising,
a motor having a plurality of stator windings opened at both ends;
an inverter circuit configured with a plurality of switch blocks whose output terminals are connected to one ends of the stator windings;
a switch unit circuit configured with a plurality of phases of switch blocks whose output terminals are connected to the other ends of the stator windings;
a control circuit for controlling respective switch elements of the inverter circuit and the switch unit circuit; and
an energy storage source connected to respective direct-current voltage input terminals of the inverter circuit and the switch unit circuit;
wherein the switch unit circuit is configured with a switch element connecting to only a diode in series connection in each of the switch blocks thereof and a changeover switch is connected between the direct-current voltage input terminal of the switch unit circuit and one of positive and negative electrodes of the energy storage source.

10. A motor controller according to claim 9, wherein the changeover switch is configured by a parallel connection of a MOSFET and a diode.

11. The motor controller comprising, a motor having a plurality of stator windings opened at both ends;
an inverter circuit configured with a plurality of phases of switch blocks whose output terminals are connected to one ends of the stator windings;
a switch unit circuit configured with a plurality of phases of switch blocks whose output terminals are connected to the other ends of the stator windings;
a control circuit for controlling respective switch elements of the inverter circuit and the switch unit circuit; and
an energy storage source connected to respective direct-current voltage input terminals of the inverter circuit and the switch unit circuit;
wherein the switch unit circuit is configured with a switch element connecting to only a diode in series connection in each of the switch blocks thereof and at least one of the switch blocks of the switch unit circuit is different from the switch blocks of the inverter circuit.

12. A motor controller comprising, a motor having a plurality of stator windings opened at both ends;
an inverter circuit configured with a plurality of phases of switch blocks whose output terminals are connected to one ends of the stator windings;
a switch unit circuit configured with a plurality of phases of switch blocks whose output terminals are connected to the other ends of the stator windings;
a control circuit for controlling respective switch elements of the inverter circuit and the switch unit circuit; and
an energy storage source connected to respective direct-current voltage input terminals of the inverter circuit and the switch unit circuit;
wherein the switch unit circuit is configured with a switch element connecting to only a diode in series connection in each of the switch blocks thereof and at least one of the switch blocks of the switch unit circuit comprises at least two elements connected in series,
wherein at least one of the elements comprises a control terminal and does not include a MOSFET or a mechanical switch.

13. A motor controller comprising,
a motor having a plurality of stator windings opened at both ends;
an inverter circuit configured with a plurality of phases of switch blocks whose output terminals are connected to one ends of the stator windings;
a switch unit circuit configured with a plurality of phases of switch blocks whose output terminals are connected to the other ends of the stator windings;
a control circuit for controlling respective switch elements of the inverter circuit and the switch unit circuit; and
an energy storage source connected to respective direct-current voltage input terminals of the inverter circuit and the switch unit circuit;
wherein the switch unit circuit is configured with a switch element connecting to only a diode in series connection in each of the switch blocks thereof and the switch blocks of the switch unit circuit comprise a switch element, a control terminal, and at least two diodes.

14. A motor controller comprising,
a motor having a plurality of stator windings opened at both ends;
an inverter circuit configured with a plurality of phases of switch blocks whose output terminals are connected to one ends of the stator windings;
a switch unit circuit configured with a plurality of phases of switch blocks whose output terminals are connected to the other ends of the stator windings;
a control circuit for controlling respective switch elements of the inverter circuit and the switch unit circuit; and
an energy storage source connected to respective direct-current voltage input terminals of the inverter circuit and the switch unit circuit;
wherein the switch unit circuit is configured with a switch element connecting to only a diode in series connection in each of the switch blocks thereof and the inverter circuit is different from the switch unit circuit.

* * * * *